United States Patent
Engelhardt

(10) Patent No.: US 6,657,187 B2
(45) Date of Patent: Dec. 2, 2003

(54) SYSTEM FOR INSPECTING MICROSCOPIC SAMPLES WITH A SCANNING MICROSCOPE

(75) Inventor: Johann Engelhardt, Bad Schoenborn (DE)

(73) Assignee: Lecia Microsystems Heidelberg GmbH, Mannheim (DE)

( * ) Notice: Subject to any disclaimer, the term of this patent is extended or adjusted under 35 U.S.C. 154(b) by 242 days.

(21) Appl. No.: 09/817,583

(22) Filed: Mar. 26, 2001

(65) Prior Publication Data

US 2001/0052567 A1 Dec. 20, 2001

(30) Foreign Application Priority Data

Jun. 17, 2000 (DE) .......................................... 200 10 829

(51) Int. Cl.⁷ ................................................. H01J 37/00
(52) U.S. Cl. ...................... 250/234; 362/33; 312/223.3; 312/249.8; 250/492.21
(58) Field of Search .................................. 250/311, 234

(56) References Cited

U.S. PATENT DOCUMENTS

| 4,725,106 | A | * | 2/1988 | Shields et al. ............ 312/223.3 |
| 5,033,804 | A | * | 7/1991 | Faris ........................ 312/223.3 |
| 5,548,113 | A | * | 8/1996 | Goldberg et al. ............ 250/234 |
| 5,905,266 | A | * | 5/1999 | Larduinat et al. ...... 250/492.21 |
| 6,053,588 | A | * | 4/2000 | Biggel et al. ............. 312/249.8 |
| 6,064,060 | A | * | 5/2000 | Konada ........................ 250/234 |

FOREIGN PATENT DOCUMENTS

| JP | 6109646 | * | 4/1994 | .......... G01N/21/88 |

OTHER PUBLICATIONS

Pawley, James B., "Handbook of Biological Confocal Microscopy", 1990, pp. 4–7 and p. 95.

* cited by examiner

Primary Examiner—Sandra O'Shea
Assistant Examiner—James W Cranson, Jr.
(74) Attorney, Agent, or Firm—Simpson & Simpson, PLLC

(57) ABSTRACT

The inventive system comprises a scanning microscope with at least one monitor, a computer and inputting means. Furthermore, at least one laser and control electronics are provided. All of these elements can be arranged on a table top. The laser and the control electronics are stored in a electromagnetically shielded housing wherein the housing can be completely stored under the table top. The housing comprises an U-shaped control panel which embraces a part of the table top when the housing is stored completely under the table top.

8 Claims, 4 Drawing Sheets

SYSTEM FOR INSPECTING MICROSCOPIC SAMPLES WITH A SCANNING MICROSCOPE

CROSS REFERENCE TO A RELATED APPLICATION

This application claims priority of an earlier filed German utility model, file number 200 10 829.8, filed Jun. 17, 2000 which is incorporated herein by reference.

FIELD OF THE INVENTION

This present invention relates generally to the field of systems for inspecting microscopic samples with a scanning microscope. Especially, the invention refers to a system which is specially designed with respect to a working place safety. In one embodiment the scanning microscope can be a confocal microscope as well.

BACKGROUND OF THE INVENTION

Scanning microscopy uses a light beam to scan a sample. Very often a laser is used as a light source. Moreover, for fluorescence applications the sample to be examined is illuminated by several lasers to excite simultaneously several dyes.

From the Handbook of Biological Confocal Microscopy by James B. Pawley, 1990, p. 95, an apparatus for simultaneously illuminating a sample with a helium neon laser and an argon laser is known.

At present, diode lasers and solid state lasers are used.

Often light from the lasers is guided by light guide fibres to the scanning microscope. Direct coupling, especially with the use of pumped lasers, is used as well. A diode laser is usually mounted directly to the scanning microscope. All lasers, especially the gas lasers, eg. the argon laser or argon-crypton mixed gas laser, need a complicated supply and control electronic which is at present stored in separate electronic housings. Moreover, means for limiting the intensity and means for blocking the light beam are provided between the scanning microscope and laser. These means are controllable as well, which means that an electric wiring is necessary from the control unit to the controllable unit.

The principles of a scanning microscope are shown in the common technical book by James B. Pawley, Handbook of Biological Confocal Microscopy, 1990, 1989, Plenum Press New York. On the pages 4–7 the basic principle of a confocal microscope is described (see FIG. 2 in Pawley). A sample is scanned with a fine focused laser beam. The light emanating from the sample reaches a detector via a beam splitter. The detector has a entrance pinhole, so that only the focused beam reaches the detector.

As can be seen from systems of the prior art the lasers and the supply and control electronics together with the scanning microscope are arranged on a table or on separate shelves. Often the electronic parts are placed on the floor and therefore limit the space of movement for a user. Another disadvantage is that essential operating elements like switches or dimmers are placed on different housings. This makes the operation of the whole system complicated and not efficient form an ergonomic point of view.

Even if each single laser together with its electronic fulfills the requirement for electromagnetic tolerance usually the whole system with the scanning microscope and the light sources exceeds the required threshold value.

SUMMARY OF THE INVENTION

It is the object of the invention to provide an ergonomic system which simultaneously solves the problem of the electromagnetic tolerance of the whole system and moreover the laser system and their control and supply electronic should be easily to service.

The above object is solved by system which comprises a scanning microscope, at least one monitor, a Personal Computer, inputting means and at least one laser and control electronics. A table defines a table top on which the scanning microscope, the monitor and the inputting means are arranged and a electromagnetic shielded housing is provided in which the laser and the control electronic is stored, wherein the housing is completely stored under the table top.

It is an advantage of the present invention that the laser is completely within a electromagnetic shielded housing wherein the housing is completely stored under the table top. The scanning microscope and the monitors for visualizing the sample image are arranged on the table top. The freedom of movement of a user is therefore not influenced by any housing under the table top.

Additionally, a control desk is provided which enables a turn-off or turn-on of the lasers and the adjustment of their intensity. With the control desk other elements like beam-blockers can be operated as well. A special embodiment of the control desk has a built-in lamp which exclusively illuminates the area of the table top. The lamp is arranged so that the sample under inspection is not influenced or interfered by any light. The control panel encompasses operation indicators as well which inform the user about the operational status of each laser.

In order not to waste any space the housing extends along the whole length of the table top.

It is advantageous to combine the inventive system with the arrangement as known from the German Patent Application DE-A-196 50 391.

The light from the lasers is guided with light guide fibres out of the housing to the scanning microscope. Additionally, control cords to the PC and scanning microscope are provided.

For service purposes the housing can be pulled out from under the table. After taking off the cover which in the closed state is electrically connected to the housing one can easily work on the different elements which are placed in a clear manner inside the housing. The electrical connection is formed for example by a web band or a conducting com.

BRIEF DESCRIPTION OF THE DRAWINGS

The nature and the mode of operation of the present invention will now be more fully described in the following detailed description of various embodiments taken with the accompanying drawings in which.

DETAILED DESCRIPTION OF THE PREFERRED EMBODIMENTS

Figure 1:
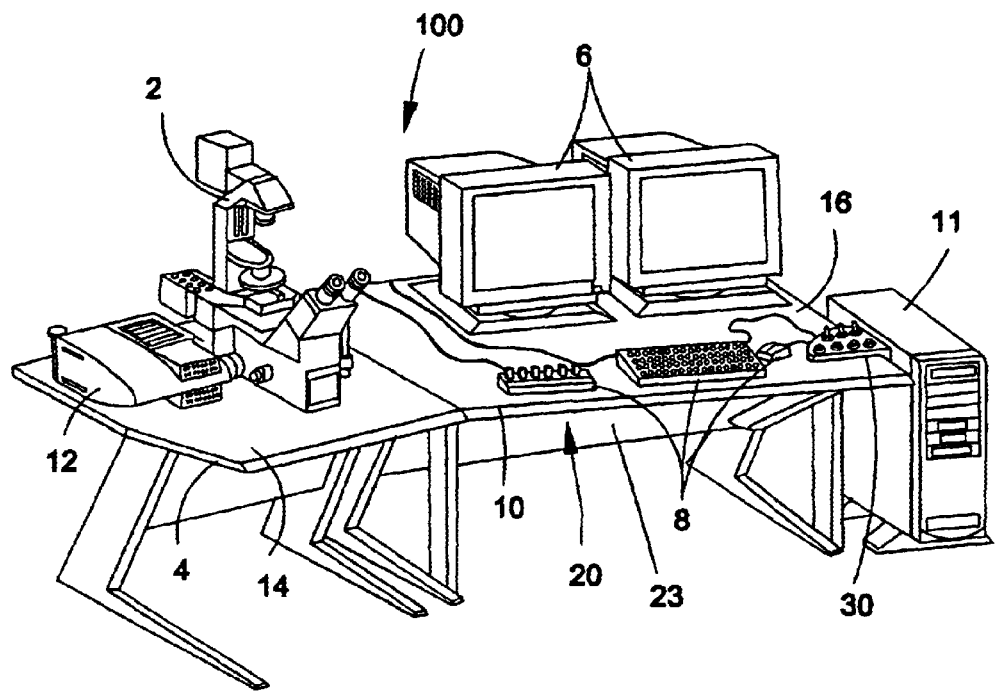
FIG. 1 is a perspective view of the system for inspecting a microscopic sample with a scanning microscope.

FIG. 1 shows a perspective view of the system for inspecting microscopic samples with a scanning microscope. The embodiment as shown in the figures shows a scanning microscope 2 which is placed on a first table 4. At least one monitor 6 and means for inputting 8 are arranged on a second table 10. It is obvious for anybody skilled in the art that the scanning microscope 2 can be placed on the second table 10 as well. For clarity reasons similar elements or parts of the invention are designated wit the same reference numerals. In the embodiment as shown in FIG. 1 the scanning microscope 2 is embodied as an inverted microscope. A scanning head 12 is lying on the first table 4 and flansh-mounted to the stand of the scanning microscope 2. The inputting unit 8 comprises a keyboard, a mouse and several control knobs to which different functions of the scanning microscope 2 can be connected. Aside of the second table 10 a computer 11 is provided which is used for image capturing, image processing, image archiving and user guidance. Under the second table 10 a housing 20 is positioned which contains the laser and control electronics. The housing 20 is electromagnetically shielded and when in place is completely out of view under table top 16 which is defined by second table 10. A control panel 30 is attached to housing 20 wherein the control panel embraces table top 16 when housing 20 is in place.

Figure 2:
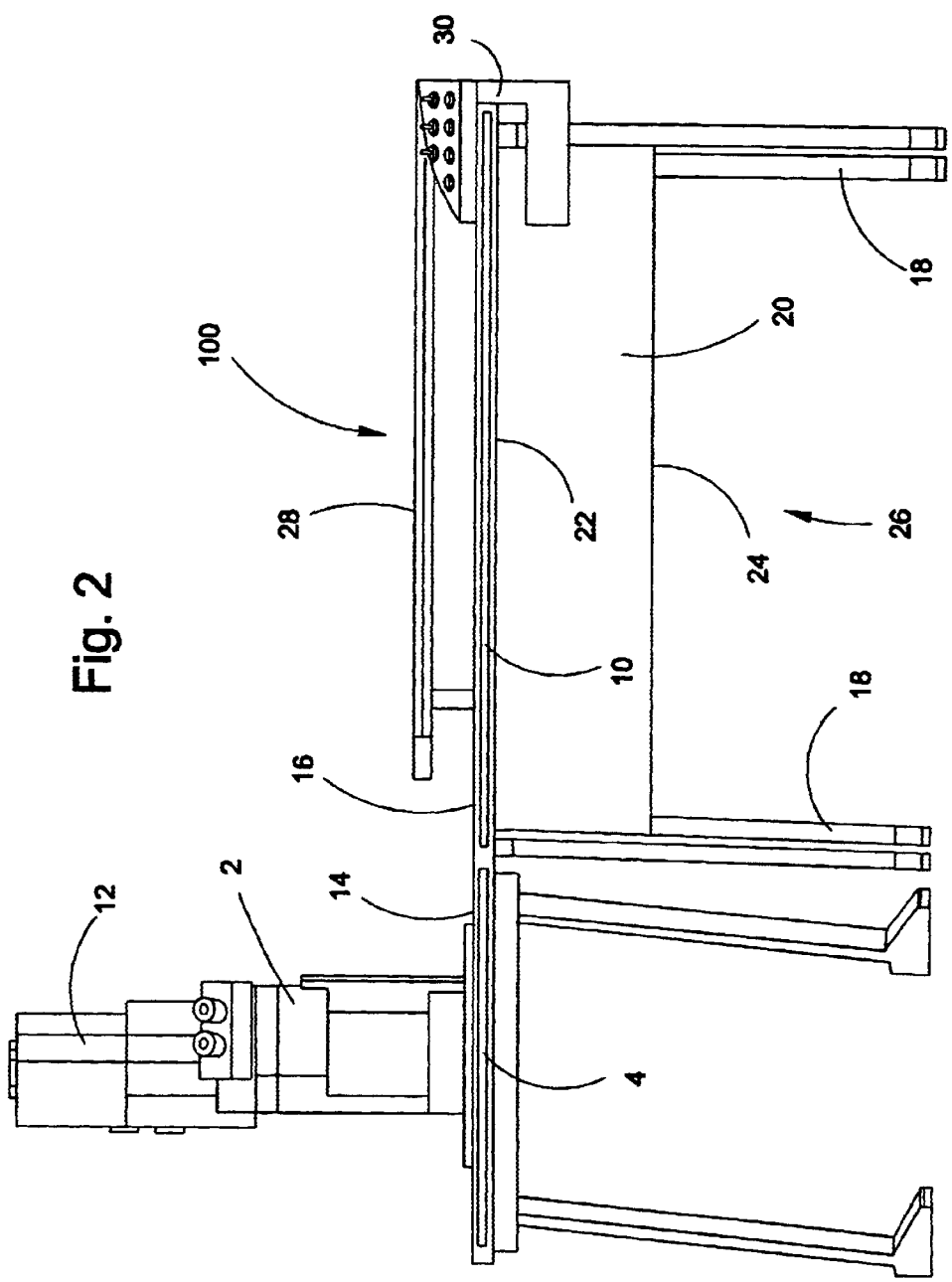
FIG. 2 is a front view of the system in which the scanning microscope is placed on a separate table.

In FIG. 2 a front view of the inventive systems 100 is shown. As already explained in the description of FIG. 1 the scanning microscope 2 is arranged on the first table 4. For this context it is not necessary to go into a detailed design of the scanning microscope 2 because it is well-known to anybody skilled in the art. A regular microscope is shown in this embodiment. A scanning microscope 2 supports a scan head 12. The first table 4 and the second table 10 are placed in such a manner to one another that the table top 14 of the first table 4 and the table top 16 of the second table 10 are lying in one plane. Under the second table 10 the housing 20 for the light sources and the control electronics is stored. Usually, lasers are used as light sources. The housing 20 defines a housing top 22, a bottom 24, a back wall and front wall. The housing top 22 may be closed by a cover or a clack. Legs 18 are attached in such a manner to the housing 20 that the housing top 22 is positioned directly under the table top 16 of the second table 10. The dimensions of the housing 20 are chosen that between the bottom 24 of the housing and the floor in which the system is arranged enough free space 26 is defined which provides enough leg room for the user. In the embodiment shown here the free space 26 extends along the whole length of second table 10. On the table top 16 of the second table 10 a further platform 28 is provided onto which at least one monitor can be placed. A U-shaped control panel 30 is attached to the housing 20. The dimensions of the U-shaped form are such that if the housing 20 is slit-in under the table top 16 the control panel 30 embraces the table top 16.

Figure 3:
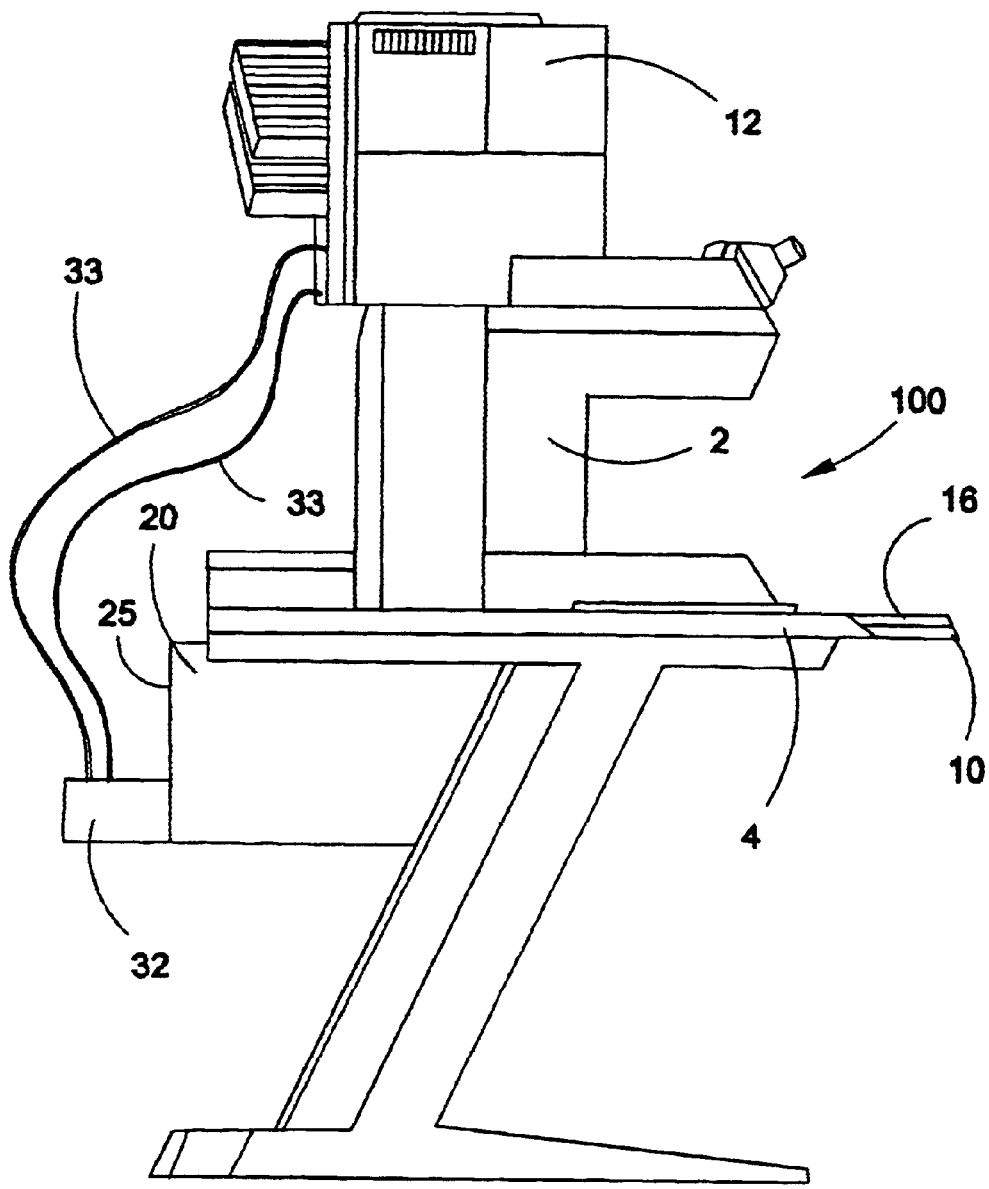
FIG. 3 is a side view of the system.

FIG. 3 shows a side view of the inventive system 100 wherein housing 20 is positioned completely under the second table 10. When in-place the housing 20 extends beyond the back of the table top 16 of the second table 10. On the back wall 25 of housing 20 a cable duct 32 is provided which affiliates electrical cords as well as light guides 33 which guide light from the light sources within the housing 20 to scanning microscope 2. Additionally, the second table 10 is provided with a stop (not shown) which limits the sliding-in motion of housing 20.

Figure 4:
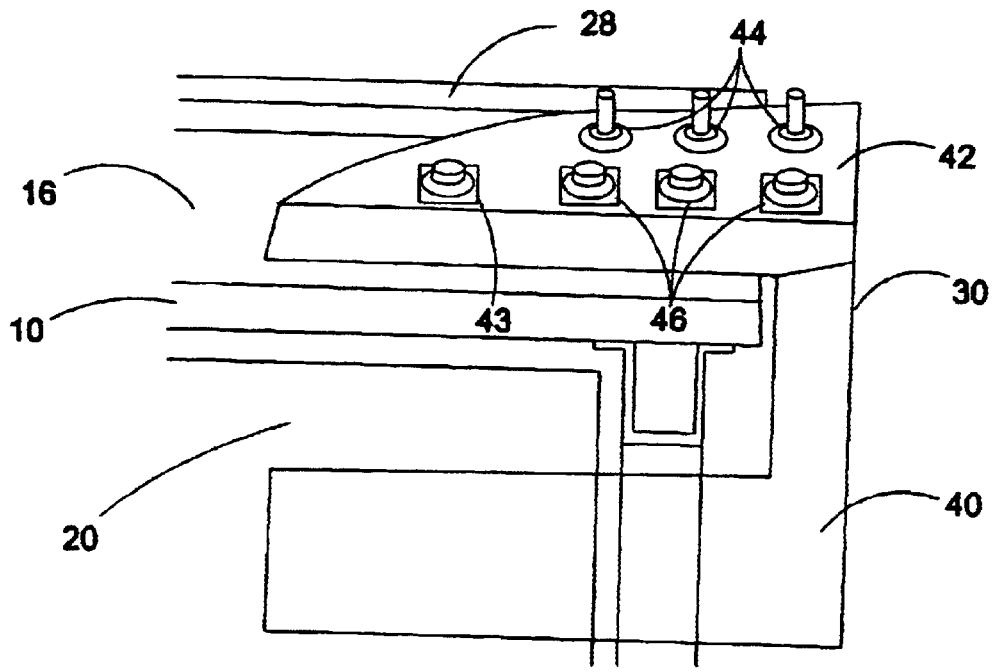
FIG. 4 is a detailed view of a control panel which is attached to the housing for the light sources and the control electronics and FIG. 5 is a top view of another embodiment of the control panel which comprises a lamp integrated in the control panel.
Figure 5:
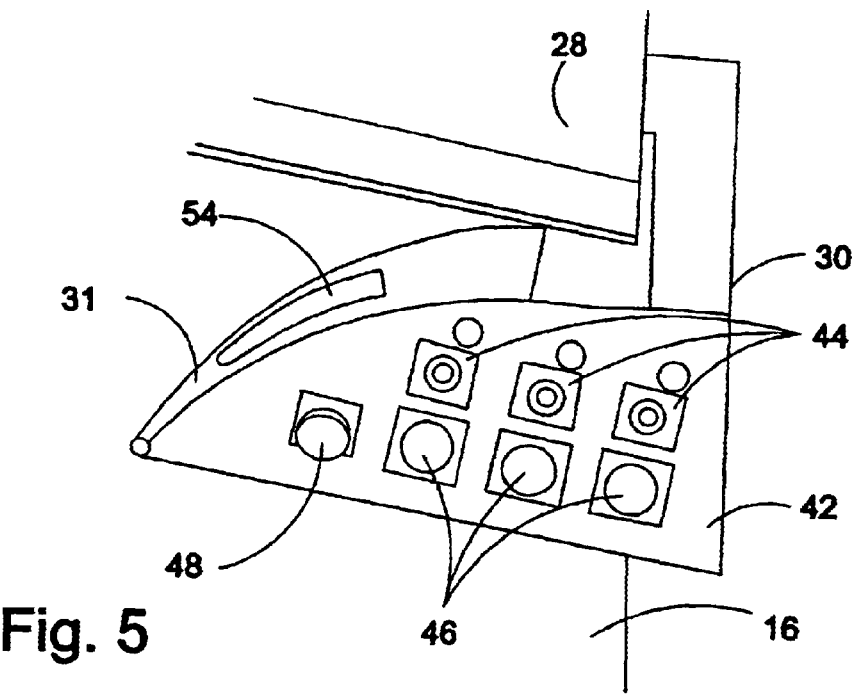

FIG. 4 and FIG. 5 show a detailed view of the control panel 30 which is mounted to the housing 20. The control panel 30 comprises a L-formed support element 40 which is directly connected to the housing 20. The support element 40 is hollow in order to provide a guide for electrical cords out of the housing 20 to the control panel 30. On the support element 40 an operating part 42 of the control panel 30 is mounted. The operating part 42 has several key switches 44, which are additionally provided with toggle switches 46. The toggle switches 46 are designed such that they emit light when the light source is switched on. The toggle switches 46 on the control panel 30 are operational status indicators for the whole system as well. In addition, a potentiometer or step-switch 48 may be provided on the operation part 42. As already shown in FIG. 2 the U-formed control panel 30 embraces the table top 16 of the second table 10. According to FIG. 5 the operation part 42 of the control panel 30 comprises an abutting face 31. An illumination device 51 is mounted in the abutting face 31. The illumination device 51 exclusively illuminates the table top 16. A light cone formed by the illumination device 51 has a form that light is shined only on the table top 16 and the imputing unit 8. The other parts of the system 100 and the rest of the room in which the system 100 is placed should receive as few light as possible. Furthermore, FIG. 5 provides information where the control panel 30 is mounted to the housing 20. In the case the housing 20 is completely slit under the table top 16 the control panel 30 is placed directly in front of the platform 28.

The invention has been described with respect to special embodiments. Nevertheless, it is clear for anybody skilled in the art that amendments or alterations can be made without leaving the scope of the claims below.

Parts list 2 scanning microscope
4 first table
6 monitor
8 inputting means
10 second table
11 computer
12 scan head
14 table top
16 table top
18 legs
20 housing
22 housing top
23 front wall
24 bottom
25 backwall
26 free space
28 platform
30 control panel
31 abutting face
32 cable duct
31 light guides
40 support element
42 operational part
44 key switch
46 toggle switch
48 select switch
51 illumination device
100 system

What is claimed is:

1. A system for inspecting microscopic samples comprising:
 a scanning microscope,
 at least one monitor,
 a computer with inputting means,
 at least one laser and control electronics,
 a table which defines a table top on which said scanning microscope, said monitor and said inputting means are arranged, and an electromagnetically shielded housing which is completely storable under said table top, wherein said housing comprises a U-shaped control panel which embraces said table top when said housing is stored completely under said table top.

2. The system as recited in claim 1, wherein said control panel comprises an illumination device for illuminating the area of said table top.

3. The system as recited in claim 1, wherein said control panel comprises operation elements for adjusting the power of said at least one laser.

4. The system as recited in claim 1, wherein said control panel comprises means for indicating the operational status of said system.

5. The system as recited in claim 1, wherein said housing extends along the whole length of said table top when stored under said table.

6. The system as recited in claim 1, wherein light from said laser is guided with a light guide fibre out of said housing.

7. The system as recited in claim 1, wherein said housing comprises a cover or a clack for opening said housing wherein said cover is made of the same material as said housing.

8. The system as recited in claim 7, wherein said cover comprises means which provide an electrical conductive connection to said housing.

* * * * *